United States Patent Office.

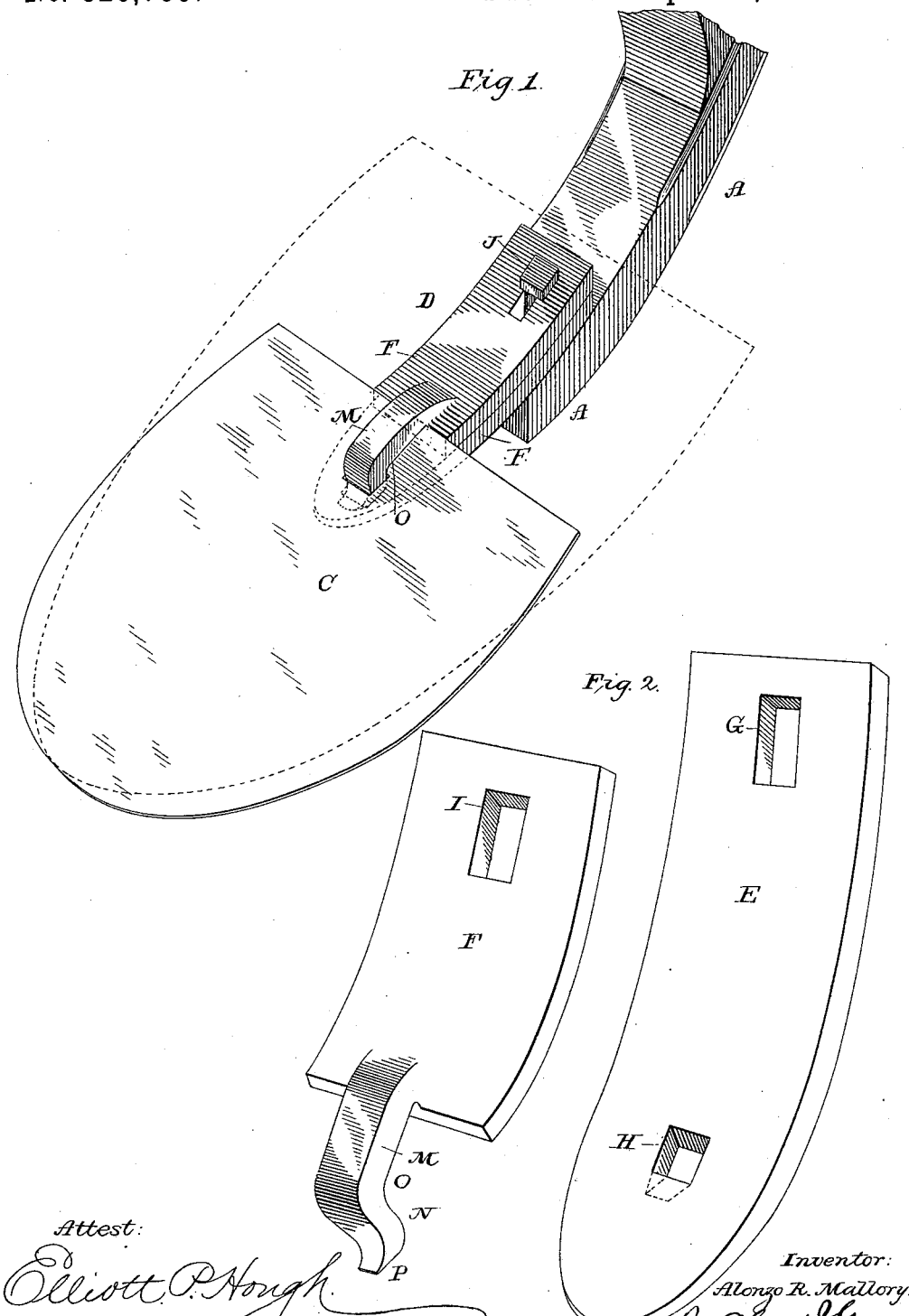

ALONZO R. MALLORY, OF MADISON, GEORGIA.

PLOW-EXTENSION.

SPECIFICATION forming part of Letters Patent No. 326,759, dated September 22, 1885.

Application filed June 5, 1885. (No model.)

*To all whom it may concern:*

Be it known that I, ALONZO R. MALLORY, a citizen of the United States of America, residing at Madison, in the county of Morgan and State of Georgia, have invented a certain new and useful Plow-Extension; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention consists, as will be hereinafter described and claimed, in an attachment for connecting a plow share, hoe, or shovel to its stock, whereby, when the point of the share becomes worn and the share rendered too short for ordinary use, the usefulness of the plow point or shovel can be extended and the use thereof continued, thereby avoiding the necessity of the frequent substitution of a new point.

In the accompanying drawings, Figure 1 represents a perspective view of a portion of a plow with my extension in position thereon. Fig. 2 represents detail views of the parts of the extension separately.

Heretofore whenever a plow point, share, plow hoe or shovel has been worn away in use so as to become too short to perform satisfactory service the custom has been to remove such share, &c., from its stock and supply its place with a fresh share. The old share is then usually thrown away as useless for further service and becomes a dead loss to the farmer.

It is the object of my invention to avoid this loss and to permit of the continued use of the plow point, share, or shovel after it has become so shortened by use in its ordinary position as to preclude its further use. This I accomplish by means of a "lengthener" or "extension" piece, which, when the share has become shortened, acts as a link to connect the share and its stock and permit of the share being placed and securely held in a lower position than it formerly occupied and so as to bring the point proper to a position the original point occupied when the share was new.

A represents a plow-stock having the customary bolt-hole, B, through which the bolt is passed to and through the hole in the upper part of the share or shovel C, to connect the shovel and stock together.

My share or shovel lengthener or extension attachment D is constructed of two separate parts or plates, E F, the under one, E, of which is of curved or other form, corresponding with the shape or contour at its upper portion with the stock and at its lower portion with the share or shovel, in order to allow its under face resting snugly against the upper face of the stock and to permit of the upper portion of the shovel resting snugly against the lower portion of the upper face of the plate E in the manner shown in the drawings. As this attachment D is constructed separately from any portion of the plow, and is intended to be supplied to plow-users so as to be on hand and applied by them to plows as needed, they will be constructed of different shapes to adapt them for use with different-shaped stocks and shares, plows, hoes, or shovels; therefore the form I have shown in the drawings is subject to variation to suit particular makes of plows; but the essential features will remain as shown in the drawings and described herein.

G represents an elongated slot or hole formed in the upper end of the plate E to receive the customary bolt employed for connecting the stock and shovel together. This plate is of such length and the slot G is so formed therein that said slot and the bolt-hole B will always register with each other. By forming the slot G elongated the vertical adjustment of said plate E upon a stock can be readily secured, thus permitting of the attachment being used to secure shares of different lengths in position and the regulation of the degree of extension of the point or shovel C.

H represents a longitudinal slot or hole formed in the bottom portion of the plate E to receive the lower end of the share-holding staple to be presently described. The upper member, F, of the lengthener is shorter than the lower member, E, and has in its upper end a slot, I, which, when the two plates are in position, registers with the slot G, the bolt J being passed through said slots G and I and clamped in position by an ordinary nut, K, and washer L, whereby the two plates E F are firmly clamped together. From the lower portion of the upper face of the shorter plate F extends downwardly a staple or lug, M, the lower end of which extends at a suitable angle inwardly, as at N, to permit of its passing within the slot H in the bottom of the plate E, so as to form a socket or recess, O, within which the upper end of the share or plow-hoe may rest and be retained. The point or lower end, P, of this link is of curved or beveled shape to permit of its being readily slid within said slot H and of gripping the under face of the plate E in substantially the manner represented in the drawings. The link M and plate F may be either cast or wrought integrally and of any suitable metal, such as steel or iron, or they may be cast or otherwise formed separately and the link subsequently welded, bolted, riveted, or otherwise attached to the plate F. Similarly the plate E may be formed of any desired metal and in any of the well-known ways—such as by casting or wrought. The width and thickness of the respective plates and of the link may also be varied to suit various requirements as to the work to be performed or the character of the plow or share with which it is to be used.

When the share or shovel C as ordinarily constructed has become so worn or shortened in use as to lose its usefulness, it is disconnected from its stock and then laid upon the lower portion of the upper face of the plate E, with the customary slot or hole in the upper end of the share or plow-hoe in register with the slot H in the bottom of the plate E. The point and lower end of the link or staple M is then passed through the slots in the shovel and the lower end of the plate E, and the plate F pressed down upon the upper portion of the plate E, which act will force the beveled or curved shaped point P in gripping-contact with the under face of the plate E or against the beveled or angular inner face, Q, of the lower end of the slot, as the case may be, it being found desirable in most cases to so bevel the plate or lower end of the slot as to form a seat for the beveled point, this form of construction being shown in the drawings. Then, when the respective parts are thus placed in position, the bottom edge of the plate F will press against the upper edge of the share or plow-hoe and force the upper edge of its slot against the transversely-extending portion of the link M, and thus clamp said shovel securely and rigidly in position. The attachment, with the shovel in position therein, is then placed with its respective slots G and I in registry with the slot or hole in the standard. The bolt is then passed therethrough and through the standard and secured, thereby clamping the whole firmly together.

By means of the elongated slot G, whenever necessary, the position of the attachment upon the plow-stock can be vertically adjusted without removing it therefrom by simply loosening the bolt J and sliding the attachment in either direction upon or along the stock A, thereby providing for the easy and speedy adjustment vertically of the share, plow hoe or shovel whenever it may be required to raise or lower the same.

By making the hole or slot H in the bottom of the plate E elongated, and making the point P of the link M of beveled shape, I am enabled to readily loosen or tighten the plow or hoe at will. This is necessary, as, when the plow point or hoe is thick or thin, by moving the bottom plate, E, up or down, as the case may be, the plow-hoe is either tightened or loosened, whichever is desired. When the hoe is very thin, it can be tightened by putting a leather washer between the bottom plate and the upper face of the hoe; but ordinarily the beveled or wedge shape of the point P will suffice to secure the hoe in position, as when the hoe is thick the point will not require to be pushed so far down within the slot H, and when the hoe is thinner then the point is pushed further down, so as to bring the thicker portion of the link into gripping-contact with the parts.

The upper plate may be formed of any plow-body—turning shovel, straight shovel, or otherwise—and be made new by attaching points thereto as is done in the lengthener.

I am aware that various arrangements have been employed for removably connecting plow points and shovels to their standards, and I do not claim such, broadly. I am not, however, aware of any device other than my own where plates of unequal length are connected to the plow-standard, one provided with a staple or link engaging with the other plate so as to link a point shortened by wear to the standard at a position below its original point of contact-connection thereto so as to bring the point of the standard-shortened shovel to the position it originally occupied before the shovel was shortened by wear.

Having thus described my invention, what I claim is—

1. The plow-extension herein described, consisting of a plate, E, having the elongated slots G and H, and having its lower end of beveled or curved shape, and a plate, F, having in its upper end a slot, I, and at its lower end a downwardly-extending prong or staple having a curved or beveled point, substantially as and for the purpose set forth.

2. The combination, with a plow-standard and a shovel, of a rear plate, E, extending below the bottom edge of the shovel and having a slot in its lower end, and a front plate, F, having at its lower end a link or staple, N, and the bolt J to permit of the adjustment or lengthening of a plow-point, substantially as set forth.

In testimony whereof I affix my signature in presence of two witnesses.

ALONZO R. MALLORY.

Witnesses:
C. W. RICHTER,
W. R. MUSTIN.